(12) United States Patent
Schmidt et al.

(10) Patent No.: US 12,691,815 B2
(45) Date of Patent: Jul. 28, 2026

(54) METHOD FOR OPERATING AN ILLUMINATING DEVICE, AND MOTOR VEHICLE

(71) Applicant: AUDI AG, Ingolstadt (DE)

(72) Inventors: Valentin Schmidt, Neuburg a.d. Donau (DE); Tilman Armbruster, Ingolstadt (DE); Stephan Berlitz, Schrobenhausen (DE)

(73) Assignee: AUDI AG, Ingolstadt (DE)

( * ) Notice: Subject to any disclaimer, the term of this patent is extended or adjusted under 35 U.S.C. 154(b) by 225 days.

(21) Appl. No.: 18/006,664

(22) PCT Filed: Jun. 30, 2021

(86) PCT No.: PCT/EP2021/067985
§ 371 (c)(1),
(2) Date: Jan. 24, 2023

(87) PCT Pub. No.: WO2022/017743
PCT Pub. Date: Jan. 27, 2022

(65) Prior Publication Data
US 2023/0278485 A1 Sep. 7, 2023

(30) Foreign Application Priority Data

Jul. 24, 2020 (DE) ..................... 10 2020 119 555.9

(51) Int. Cl.
B60Q 1/14 (2006.01)
B60Q 1/24 (2006.01)
(Continued)

(52) U.S. Cl.
CPC ............. B60Q 1/143 (2013.01); B60Q 1/247 (2022.05); G01J 1/44 (2013.01); G01J 3/2823 (2013.01);
(Continued)

(58) Field of Classification Search
CPC .... B60Q 1/085; B60Q 2300/054; B60Q 1/04; B60Q 1/1423; B60Q 2300/112;
(Continued)

(56) References Cited

U.S. PATENT DOCUMENTS

| | | | |
|---|---|---|---|
| 11,962,953 B2* | 4/2024 | Jadav ..................... | H04N 7/183 |
| 2010/0052550 A1* | 3/2010 | Kobayashi ............. | B60Q 1/143 |
| | | | 315/158 |

(Continued)

FOREIGN PATENT DOCUMENTS

| | | |
|---|---|---|
| DE | 19822142 A1 | 11/1999 |
| DE | 102009039179 A1 | 3/2010 |

(Continued)

OTHER PUBLICATIONS

Publisher: DE 102012001017 A1 (GM Global Tech Operations Inc [US]) Date: Jul. 25, 2013 (Jul. 25, 2013) (Year: 2013).*

(Continued)

*Primary Examiner* — Wei (Victor) Y Chan
(74) *Attorney, Agent, or Firm* — Sterne, Kessler, Goldstein & Fox P.L.L.C.

(57) ABSTRACT

A method for operating an illuminating device of a motor vehicle, wherein light is radiated into a lighting volume by the illuminating device, wherein a control condition is evaluated, the fulfillment of which depends on whether the lighting volume comprises a partial lighting volume by which an area and/or an environment volume is illuminated that is illuminated or can be illuminated by an infrastructure luminaire, wherein when the control condition is fulfilled, the illuminating device is controlled in such a way that light is radiated into the partial lighting volume with a different light intensity than into a residual lighting volume of the lighting volume, which residual lighting volume lies outside the partial lighting volume.

15 Claims, 1 Drawing Sheet

(51) Int. Cl.

| | | |
|---|---|---|
| *G01J 1/42* | (2006.01) |
| *G01J 1/44* | (2006.01) |
| *G01J 3/28* | (2006.01) |
| *H05B 47/11* | (2020.01) |

(52) U.S. Cl.
CPC ........ *H05B 47/11* (2020.01); *B60Q 2300/054* (2013.01); *B60Q 2300/3321* (2013.01); *B60Q 2300/45* (2013.01); *G01J 2001/4247* (2013.01)

(58) Field of Classification Search
CPC ........ B60Q 2300/116; B60Q 2300/122; B60Q 2300/134; B60Q 2300/142; B60Q 2300/21; B60Q 2300/23
See application file for complete search history.

(56) References Cited

U.S. PATENT DOCUMENTS

| | | | |
|---|---|---|---|
| 2010/0265330 A1* | 10/2010 | Li .......................... G06V 10/44 | |
| | | | 348/148 |
| 2013/0177202 A1* | 7/2013 | Dierks ................... B60Q 1/085 | |
| | | | 362/466 |
| 2014/0071702 A1 | 3/2014 | Faber et al. | |
| 2016/0114720 A1 | 4/2016 | Schlaug et al. | |
| 2017/0144587 A1* | 5/2017 | Ogawa ................ B60Q 1/0023 | |
| 2020/0198527 A1 | 6/2020 | Koehler et al. | |

FOREIGN PATENT DOCUMENTS

| | | | |
|---|---|---|---|
| DE | 102011004937 A1 | 9/2012 |
| DE | 102012009908 A1 | 1/2013 |
| DE | 102011081396 A1 | 2/2013 |
| DE | 102012001011 A1 | 7/2013 |
| DE | 102012001017 A1 | 7/2013 |
| DE | 102012020412 A1 | 4/2014 |
| DE | 102014221647 A1 | 4/2016 |
| DE | 102016121536 A1 | 6/2017 |
| DE | 102016207306 A1 | 11/2017 |
| DE | 102016124933 A1 | 7/2018 |
| DE | 102017203352 A1 | 9/2018 |
| DE | 102017119394 A1 | 2/2019 |
| DE | 102019001889 A1 | 9/2019 |
| EP | 2065253 A2 | 6/2009 |
| EP | 2165881 A1 | 3/2010 |

OTHER PUBLICATIONS

Publisher: EP 2165881 A1 Author: (Valeo Vision [FR]) Date: Mar. 24, 2010 (Mar. 24, 2010) (Year: 2010).*
Publisher: DE 102016124933 A1 Author: (Hella Gmbh & Co KGAA [DE]) Date: Jul. 5, 2018 (Jul. 5, 2018) (Year: 2018).*
Publisher: DE 102019001889 A1 Author: (Daimler AG [DE]) Date: Sep. 5, 2019 (Sep. 5, 2019) (Year: 2019).*
Publisher: DE 102012001017 A1 (GM Global Tech Operations Inc [US]) Date: Jul. 25, 2013 (Jul. 25, 2013) Translation (Year : 2013).*
Publisher: EP 2165881 A1 Author: (Valeo Vision [FR]) Date: Mar. 24, 2010 (Mar. 24, 2010) Translation (Year: 2010).*
Publisher: DE 102016124933 A1 Author: (Hella Gmbh & Co KGAA [DE]) Date: Jul. 5, 2018 (Jul. 5, 2018) Translation (Year: 2018).*
Publisher: DE 102019001889 A1 Author: (Daimler AG [DE]) Date: Sep. 5, 2019 (Sep. 9, 2019) Translation (Year: 2019).*
International Preliminary Report on Patentability directed to related International Patent Application No. PCT/EP2021/067985, completed Mar. 15, 2022, with attached English-language translation; 15 pages.
International Search Report of the International Searching Authority and Written Opinion for related International Patent Application PCT/EP2021/067985, mailed Oct. 19, 2021, with attached English-language translation; 13 pages.

\* cited by examiner

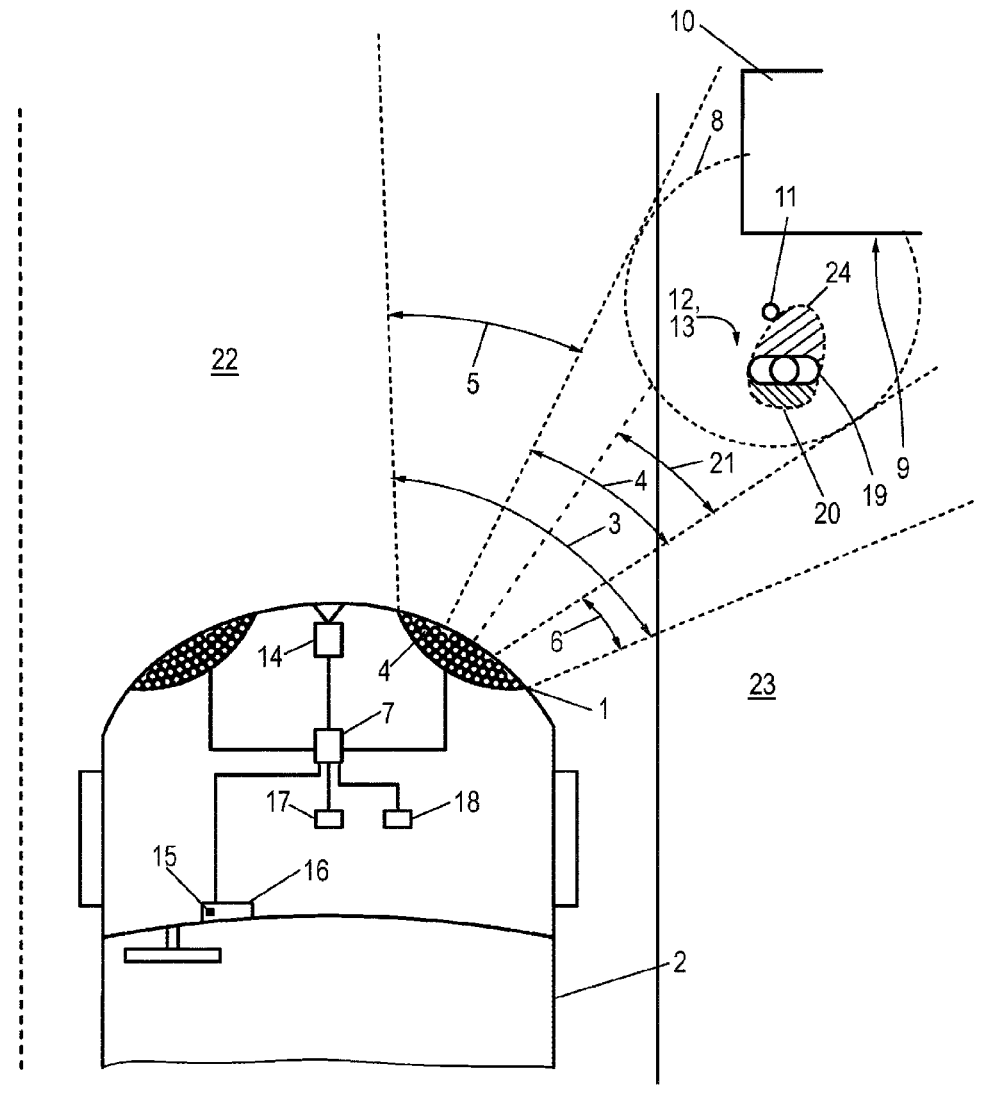

METHOD FOR OPERATING AN ILLUMINATING DEVICE, AND MOTOR VEHICLE

TECHNICAL FIELD

The present disclosure relates to a method for operating an illuminating device of a motor vehicle, wherein light is radiated into a lighting volume by the illuminating device. In addition, the present disclosure relates to a motor vehicle with an illuminating device.

BACKGROUND

If a motor vehicle moves in the dark on an illuminated road, for example within a town, the illumination of the road and the adjacent regions, i.e., in particular of bicycle and walking paths, is to take place by means of a low-beam light or city light. It is therefore known, for example, from document DE 10 2012 020 412 A1 to automatically recognize a journey of the motor vehicle within a town and to automatically change to a low-beam light with the aid of a high beam assistant. The night travel is recognized by the fact that at least one light source in the detection region of a detector device is classified as road lighting, and under the condition that departure from the detection region by the light source is recognized, a night travel of the vehicle is recognized.

A disadvantage here is that illumination by infrastructure does not enable optimal recognition of other road users, in particular pedestrians or cyclists on bicycle or walking paths, in all driving situations. For example, it is customary to use street lamps, for example sodium-vapor lamps, with almost monochromatic light, as a result of which, for example, color differences between pedestrians or cyclists and a background do not contribute to the contrast in all cases. Even with relatively low illumination intensities due to the illumination by infrastructure, a differentiation of colors is not possible or is possible only to a limited extent. If persons or objects are located substantially directly below the light center of an infrastructure luminaire, almost no shadow is cast as a result, so that the recognition of these objects or persons can be more difficult.

The mentioned factors can contribute to making more difficult the recognition of persons or objects by the driver of the vehicle or by driver assistance systems based, for example, on image recognition.

BRIEF DESCRIPTION OF DRAWINGS

The accompanying drawings, which are incorporated herein and form a part of the specification, illustrate the embodiments of the present disclosure, and together with the description, further serve to explain the principles of the embodiments and enable a per-son skilled in the pertinent art to make and use the embodiments, individually, or as a combination thereof.

FIG. 1 schematically shows a driving situation in accordance with an exemplary embodiment of the approach herein.

In the drawings, like reference numbers generally indicate identical or similar ele-ments. Additionally, generally, the left-most digit(s) of a reference number identifies the drawing in which the reference number first appears.

DETAILED DESCRIPTION

The present disclosure is therefore based on the object of improving the recognizability of objects in the vehicle surroundings by the driver or by an image-based driver assistance system in dark conditions, in particular during a journey in closed locations or in other regions with illumination by infrastructure.

The object is achieved according to the present disclosure by a method for operating an illuminating device of a motor vehicle, wherein light is radiated into a lighting volume by the illuminating device, wherein a control condition is evaluated, the fulfillment of which depends on whether the lighting volume comprises a partial lighting volume by which an area and/or an environment volume is illuminated that is illuminated or can be illuminated by an infrastructure luminaire, wherein when the control condition is fulfilled, the illuminating device is controlled in such a way that light is radiated into the partial lighting volume with a different light intensity than into a residual lighting volume of the lighting volume, which residual lighting volume lies outside the partial lighting volume.

The present disclosure is based on the idea of taking into account, during the illumination of the vehicle surroundings, which areas or environment volume are already illuminated or can be illuminated by at least one infrastructure luminaire. In this case, in particular in the above-mentioned situations in which the infrastructure luminaire does not lead to an optimal object recognition, the light intensities radiated into these regions can be increased in order to avoid the disadvantages explained above. In some driving situations, however, the illumination by the infrastructure luminaire may also be sufficient for an illumination of the partial lighting volume to take place with a lower light intensity than the illumination of the residual lighting volume.

The infrastructure luminaire may in particular be a road lighting, e.g., a street lamp. However, it may also be a luminaire used primarily to illuminate a walking or bicycle path. A light intensity can in particular be understood to mean an intensity per solid angle. In this case, a beam intensity can be used as light intensity, but it is also possible to carry out a photometric weighting according to the sensitivity of the eye, whereby a luminosity can be used as the light intensity.

The residual lighting volume can comprise the entire lighting volume outside the partial lighting volume. In particular, a plurality of partial lighting volumes can also be recognized, which illuminate the area or environment volume, which are illuminated or can be illuminated by the same infrastructure luminaire or also by different infrastructure luminaires.

The illuminating device can in particular be configured to illuminate a solid angle, wherein the light intensity radiated into the solid angle can be specified separately for different partial angular regions of the solid angle. This can be realized, for example, by the illuminating device comprising a plurality of lighting means, for example a plurality of light-emitting diodes of a headlamp. Alternatively or additionally, a controllable diaphragm, for example an LCD panel, can be used to reduce the brightness in different partial angle regions. Corresponding illuminating devices for motor vehicles are known in principle, for example locally resolving light systems, which can be implemented, for example, as high-resolution projection systems, or low-beam lights formed from a plurality of segments. In addition or as an alternative to normal headlamps, it is also possible to use cornering lights, for example bending lights or the like, for the illumination of the near field.

The illuminating device can additionally be controlled as a function of further vehicle systems, i.e., for example, as a function of an object detection and/or a chassis electronics and/or a drive electronics system and/or a navigation system. For example, an illuminated solid angle region can automatically be adapted as a function of a chassis state in order to compensate for loading or pitching of the vehicle. Areas or environment volumes that are illuminated by an infrastructure luminaire can be defined, for example, by their direction and their distance as well as by their radius, or their height and width and/or depth. The region to be illuminated by the illuminating device can also be defined accordingly, or the solid angles discussed above can be used to define the lighting volume or partial lighting volume.

Light can be radiated into the partial lighting volume with a higher light intensity than into the residual lighting volume. For example, the light intensity radiated into the partial lighting volume can be at least 20%, at least 30%, or at least 50% higher than the light intensity radiated into the residual lighting volume.

Intensive illumination of the surroundings of infrastructure luminaires, i.e., for example, of street lamps, by the vehicle's own illuminating device leads to an increased contrast of persons or objects to the environment. If, for example, the illumination by the infrastructure luminaire is largely monochromatic, a color differentiation can be improved by additional spectral components of the light of the motor-vehicle illuminating device. In addition, objects or persons are illuminated laterally by the vehicle illuminating device, resulting in a stronger shadowing than in the case of substantially vertical illumination, as results frequently with the use of infrastructure luminaires. This can improve the recognition of the objects or persons by the driver or by vehicle assistance systems. In addition, increasing the brightness generally has the result that even weak contrasts can be recognized better.

Using a sensor device, in particular a camera, image data relating to the surroundings of the motor vehicle can be detected, wherein it is determined by evaluating the image data whether the infrastructure luminaire is present and/or whether it is illuminating the area and/or the environment volume. In particular, a sensor device of the motor vehicle can be used here. However, it is also possible to use an infrastructure sensor device or a sensor device of a further motor vehicle. In these cases, the sensor data or processing data resulting therefrom can be provided wirelessly, for example via Car2Car or Car2X communication, to the motor vehicle, within which the further processing can take place, in particular the check of the control condition.

By evaluating the image data, the luminaire can be recognized in the surroundings, and in particular the position and/or orientation of the luminaire and thus the illuminated or illuminable environment volume can also be recognized. Recognition or classification of infrastructure luminaires is known per se from the prior art, for example from DE 10 2012 020 412 A1, cited above. Here, corresponding luminaires can be detected, for example, on the basis of their positions at a certain height above the road or above walking or bicycle paths. Additionally or alternatively, the movement relative to the motor vehicle can be evaluated during a movement of the motor vehicle in order to distinguish it from other light sources, for example from light sources of other vehicles.

Additionally or alternatively, through evaluation of the image data, it is possible to directly recognize illuminated areas in the vehicle surroundings, for example by recognizing contrast jumps. The recognized areas illuminated by luminaires can be taken into account directly in the method according to an embodiment or can be used to deduce the illuminated environment volume or the position and orientation of the luminaire.

The, or a, sensor device can detect light from the infrastructure luminaire, in particular after reflection by the illuminated area, after which an item of spectral information relating to the spectrum of this light is determined on the basis of sensor data of the sensor device, the fulfillment of the control condition and/or the light intensity of the light radiated into the partial lighting volume depending on the spectral information. The reflection of the light by the illuminated area can in particular be a diffuse reflection, which is also referred to as scattering. The sensor device is preferably a motor-vehicle sensor device. As explained above, however, sensor devices external to the vehicle can also be used.

As explained above, a largely monochromatic illumination of the vehicle surroundings by an infrastructure luminaire can in particular be problematic with respect to the robust detection of persons or objects. If, on the other hand, luminaires that emit light over a relatively wide spectrum, for example fluorescent tubes or the like, are used, depending on the circumstances, no increase in the light intensity in the partial lighting volume, or a lower increase in the intensity, may be required. In order to avoid unnecessarily strong illumination, it may therefore be advantageous to evaluate the spectral information.

In principle, it would be possible to use a spectrometer as a sensor device for determining the spectral information. However, since a spectrometer is typically not installed in the motor vehicle, a relatively large technical effort would be required to implement the method in this case. A color imaging camera, as is frequently present in the motor vehicle anyway, can therefore be used to determine the spectral information. For example, on the basis of a histogram of the color values occurring in the image, it can be recognized whether the imaged scene is illuminated substantially monochromatically or by light with a wide spectrum.

Using the, or a, sensor device, the environmental data at least partially imaging the illuminated area and/or the environment volume can be detected, a position of the object with respect to the infrastructure luminaire and/or a property of a shadow cast by the object being determined for an object imaged by the environmental data, and the fulfillment of the control condition and/or the light intensity of the light radiated into the partial lighting volume depending on the position and/or on the shadow property. As explained above, a sensor device of the motor vehicle or an external sensor device can be used.

It has already been explained above that, in particular in the case of relatively weakly illuminated scenes, a shadow cast by an object can contribute significantly to the recognizability of the object. If it is now recognized, on the basis of the shape of the shadow of an object or on the basis of the dimensions thereof or on the basis of the position of the object with respect to the luminaire, that a substantially vertical illumination is taking place, resulting in a shadowing that is difficult to recognize, the control condition can be fulfilled or a high light intensity can be radiated into the partial lighting volume in order to achieve an enhanced shadowing by the additional illumination and thereby to improve the recognizability of the object.

In the method according to an embodiment, it is possible to determine on the basis of digital map data whether the infrastructure luminaire is present. Additionally or alternatively, a position and/or an orientation of the luminaire can be specified by digital map data or can be determined therefrom. Corresponding digital map data can be provided, for example, by a navigation system of the motor vehicle or by some other vehicle-internal database, or wirelessly by a database external to the vehicle. The use of the digital map data can be combined particularly advantageously with a sensor detection of the luminaire or of the illuminated area or of the illuminated environment volume, whereby it can be determined, for example, whether the luminaire is currently being operated or not.

The illuminated area, or an environment section situated below the illuminated area or the environment volume or the infrastructure luminaire, can be classified, the fulfillment of the control condition and/or the light intensity of the light radiated into the partial lighting volume depending on whether the illuminated area or the environment section is classified as a walking path or bicycle path. As a result, through the method according to an embodiment, walking paths or bicycle paths that are in part not illuminated sufficiently strongly by infrastructure luminaires can in particular be illuminated with increased light intensity in order to enable robust object recognition in these regions. On the other hand, motor vehicles or the course of the route, road markings, and the like are frequently adequately recognizable with illumination by infrastructure so that the increase in light intensity according to an embodiment can be done, for example, exclusively for walking paths or bicycle paths or can be particularly strong there.

The classification can take place, for example, on the basis of image data of the or a sensor device, in particular a motor-vehicle sensor device. Additionally or alternatively, the previously mentioned digital map data or further digital map data, for example map data of a navigation system of the motor vehicle, can be used for classification.

In addition to the method according to the present disclosure, an embodiment relates to a motor vehicle having an illuminating device and a control device, wherein the control device is configured to evaluate the control condition according to the method of an embodiment and to control the illuminating device as a function of the fulfillment of the control condition. The illuminating device can in particular be designed as explained above. The control device can in particular be configured to control a light intensity of the illuminating device separately for different partial lighting volumes of the lighting volume. For this purpose, for example, a plurality of light-emitting diodes of the illuminating device can be controlled in their brightness by a separate pulse-width modulation. Alternatively or additionally, a locally controllable diaphragm can be controlled accordingly, or the like.

The motor vehicle preferably comprises at least one sensor device in order to detect the information explained above and to evaluate it in the context of the evaluation of the control condition, or to determine a light intensity that is to be radiated into the partial lighting volume.

Further advantages and details of the present disclosure emerge from the following exemplary embodiments and the associated FIGURE. Here, FIG. 1 schematically shows a driving situation in which an exemplary embodiment of the method according to the present disclosure is carried out by an exemplary embodiment of the motor vehicle.

FIG. 1 shows a driving situation in which a motor vehicle 2 is traveling along a road 22. In the case of night travel, next to the road 22, a walking path 23 located adjacent to the road 22 is at least partially illuminated by an illuminating device 1 of the motor vehicle 2. In this case, a control device 7 of the motor vehicle 2 is configured to control the illuminating device 1 in order to specify a respective light intensity radiated into different solid angle regions. In the example shown, this is realized in that the illuminating device 1 is formed by a plurality of individual lighting means 4, for example by individual light-emitting diodes. Alternatively or additionally, for example, a controllable diaphragm, for example a segmented LCD panel, could also be used to radiate different light intensities into different solid angles.

In the example shown, an environment volume 8 and thus also an object 19 located there, in the example a pedestrian, is illuminated by an infrastructure luminaire 11. The luminaire 11 also at least partially illuminates the background, in particular the area 9 of the house 10 and the area 12, i.e., the surface of the walking path 23.

In some cases, for example when a largely monochromatic illumination takes place, the contrast between the object 19 and the background may be very weak since, in this case, color differences frequently cannot be recognized, for example. Since the infrastructure luminaire 11 illuminates the object 19 largely vertically, the shadow 20 of the object 19 is also hardly recognizable by a driver of the motor vehicle 2 or by its sensor device 14 so that it is desirable overall to improve the recognizability of the object 19.

Therefore, a control condition is evaluated by the control device 7, the fulfillment of which depends on whether the lighting volume 3 comprises a partial lighting volume 4 by which an area 9, 12 or an environment volume 8 is illuminated or can be illuminated. When the control condition is fulfilled, the illuminating device is controlled in such a way that light is radiated into the partial lighting volume 4 with a different light intensity, in particular with a higher light intensity, than into a residual lighting volume 5, 6 of the lighting volume 3, which residual lighting volume lies outside the partial lighting volume 4.

Since the illuminating device 1 can provide approximately white light or at least light with a different spectral composition than the infrastructure luminaire 11, the differentiability of colors and thus the contrast between the object 19 and the background can be improved as a result. In addition, due to the approximately horizontal illumination of the object 19 by the illuminating device 1, a clearly recognizable shadow 24 is cast by the object 19. The increase in the overall brightness in the surroundings of the object 19 additionally already leads to better recognizability of weak contrasts in this region. A signifi-cant improvement in the recognizability of the object 19 is thus achieved overall.

The presence of the luminaire 11 or of the environment volume 8 illuminated by it, or the illuminated areas 9, 12, can be recognized by evaluating image data of the sensor device 14. Alternatively or additionally, information relating to the luminaire 11 can be provided by digital map data 15, which can originate, for example, from a navigation system 16 of the motor vehicle 2.

The described procedure can in principle always be used when an infrastructure luminaire 11 or illuminated areas 9, 12 or environment volumes 8 are recognized. An unnecessarily strong illumination of the vehicle surroundings, however, can increase the energy consumption of the motor vehicle 2 on the one hand and, in some circumstances, can have a disturbing effect on other traffic participants or residents on the other hand. It is therefore advantageous to carry out stronger illumination only if actually necessary or advantageous for improved object recognition, or only in areas where this is the case. The fulfillment of the control condition or the light intensity used in the partial lighting volume 4 may thus depend on further factors.

As explained above, an increased illumination by the illuminating device 1 can be expedient in particular when the infrastructure luminaire 11 illuminates the scene largely monochromatically. In order to recognize this, light of the infrastructure luminaire can be detected by the sensor device 14, after which spectral information for this light can be determined, for example by evaluation of the image data by the control device 7. For example, a histogram for the colors of the pixels of the image can be determined, as a result of which it can be recognized on the basis of this histogram whether a narrowband or broadband illumination of the scene is taking place. The control device 7 can thus control the illuminating device 1, for example, for an increased illumination of the partial lighting volume 4, or can specify a particularly high light intensity for this partial lighting region 4, only if an almost monochromatic illumination is detected.

The sensor data, in particular image data, of the sensor device 14 can also be evaluated by the control device 7 in order to determine a property of the shadow 20 of the object 19 or the position of the object 19 with respect to the light source 11. This can be used to carry out an illumination of the partial lighting volume 4 with a higher intensity, or to use a particularly high light intensity, only if it is recognized on the basis of the shadow 20 or the position of the object 19 that strong illumination can be advantageous in order to form a shadow 24 that is better recognizable.

As already explained, illumination of the surroundings by infrastructure lamps is frequently sufficient to easily recognize motor vehicles, road markings, and the like. Therefore, what is primarily intended is an improved illumination for bicycle paths or walking paths. It is thus possible for the area 12 or the environment section 13 below the luminaire 11 or the environment volume 8 to be classified; in the example, a large part of the illuminated area 12 is the walking path 23. The control condition may then be fulfilled, or a particularly strong increase in the light intensity may then be used, only if the area 12 or the environment section 13 is classified as a walking path or bicycle path.

The described conditions may, for example, have the result that the control condition in the example shown is only fulfilled for a narrower partial lighting volume 21 since an increase in the light intensity in this partial lighting volume is sufficient to significantly improve recognition of the object 19.

The invention claimed is:

1. A method for operating an illuminating device of a motor vehicle, wherein light is radiated into a lighting volume by the illuminating device, the method comprising:
  evaluating a fulfillment of a control condition, wherein the control condition is fulfilled when the lighting volume comprises a partial lighting volume that illuminates an area and/or environment volume that is illuminated by an infrastructure luminaire and when the partial lighting volume comprises vertical illumination detected using a shadow of an object in the area and/or environment volume; and
  when the control condition is fulfilled, controlling the illuminating device to increase an optical contrast between the object and a background in the area and/or environment volume from a perspective of the motor vehicle such that light is radiated into the partial lighting volume with a higher light intensity than light is radiated into a residual lighting volume of the lighting volume, wherein the residual lighting volume lies outside the partial lighting volume.

8

2. The method according to claim 1, further comprising:
  detecting, by a sensor device, image data relating to a surroundings of the motor vehicle, the sensor device being a camera; and
  based on an evaluation of the image data, determining whether the infrastructure luminaire is present or whether the infrastructure luminaire is illuminating the illuminated area or the environment volume.

3. The method according to claim 1, further comprising:
  detecting, by a sensor device, sensor data based on detecting light of the infrastructure luminaire;
  determining, from the detected light, using the sensor data, spectral information relating to a spectrum of the detected light; and
  the evaluating of the control condition is further based on the spectral information.

4. The method according to claim 3, further comprising:
  providing, by the sensor device, environmental data that at least partially images the illuminated area or the environment volume,
  determining a position of the object with respect to the infrastructure luminaire or determining a property of the shadow cast by the object, the object being imaged by the environmental data; and
  the evaluating the fulfillment of the control condition or a light intensity of the light radiated into the partial lighting volume is further based on the position of the object or the property of the shadow cast by the object.

5. The method according to claim 1, further comprising:
  determining, based on digital map data, whether the infrastructure luminaire is present.

6. The method according to claim 4, wherein the illuminated area or an environment section that is situated below the illuminated area or the environment volume, or below the infrastructure luminaire is classified, the method further comprising:
  the evaluating the fulfillment of the control condition or the light intensity of the light radiated into the partial lighting volume is further based on whether the illuminated area or the environment section is classified as a walking path or a bicycle path.

7. A motor vehicle comprising:
  an illuminating device configured to radiate light into a lighting volume, wherein the lighting volume comprises a partial lighting volume and a residual lighting volume; and
  a control device configured to:
    evaluate a control condition and to control the illuminating device as a function of a fulfillment of the control condition, the control device further configured to:
  evaluate a fulfillment of a control condition, wherein the control condition is fulfilled when the lighting volume comprises a partial lighting volume that illuminates an area and/or environment volume that is illuminated by an infrastructure luminaire and when the partial lighting volume comprises vertical illumination detected using a shadow of an object in the area and/or volume environment volume; and
  when the control condition is fulfilled, control the illuminating device to increase an optical contrast between the object and a background in the area and/or environment volume from a perspective of the motor vehicle such that light is radiated into the partial lighting volume with a higher light intensity than light is radiated into the residual lighting volume of the lighting volume, the residual lighting volume lying outside the partial lighting volume.

8. The method of claim 1, further comprising illuminating the partial lighting volume with a higher light intensity based on detecting illumination of the partial lighting volume by a monochromatic light radiated by the infrastructure luminaire.

9. The method of claim 1, further comprising controlling an illumination characteristic of a plurality of light-emitting diodes forming the illuminating device by pulse width modulation.

10. The method of claim 1, further comprising controlling an illumination characteristic of the illuminating device using a locally controllable diaphragm.

11. The method of claim 1, further comprising radiating light into the partial lighting volume by the illuminating device with a spectral composition different from the light provided by the infrastructure luminaire.

12. The motor vehicle of claim 7, wherein the control device is further configured to illuminate the partial lighting volume with a higher light intensity based on detecting illumination of the partial lighting volume by a monochromatic light radiated by the infrastructure luminaire.

13. The motor vehicle of claim 7, wherein the control device is further configured to control an illumination characteristic of a plurality of light-emitting diodes forming the illuminating device by pulse width modulation.

14. The motor vehicle of claim 7, wherein the control device is further configured to control an illumination characteristic of the illuminating device using a locally controllable diaphragm.

15. The motor vehicle of claim 7, wherein the control device is further configured to radiate light into the partial lighting volume by the illuminating device with a spectral composition different from the light provided by the infrastructure luminaire.

* * * * *